US010120600B2

(12) United States Patent
Shallal et al.

(10) Patent No.: US 10,120,600 B2
(45) Date of Patent: *Nov. 6, 2018

(54) PERSISTENT MEMORY DESCRIPTOR

(71) Applicant: Rambus Inc., Sunnyvale, CA (US)

(72) Inventors: Aws Shallal, Cary, NC (US); Collins Williams, Raleigh, NC (US); Dan Kunkel, Santa Clara, CA (US); William Wolf, Santa Clara, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/728,936

(22) Filed: Oct. 10, 2017

(65) Prior Publication Data

US 2018/0088843 A1 Mar. 29, 2018

Related U.S. Application Data

(63) Continuation of application No. 14/963,098, filed on Dec. 8, 2015, now Pat. No. 9,785,365.

(51) Int. Cl.
| | |
|---|---|
| *G06F 12/00* | (2006.01) |
| *G06F 3/06* | (2006.01) |
| *G06F 11/14* | (2006.01) |
| *G06F 12/02* | (2006.01) |
| *G06F 12/0802* | (2016.01) |

(52) U.S. Cl.
CPC ............ *G06F 3/0619* (2013.01); *G06F 3/065* (2013.01); *G06F 3/0608* (2013.01); *G06F 3/0685* (2013.01); *G06F 11/1446* (2013.01); *G06F 11/1448* (2013.01); *G06F 12/0238* (2013.01); *G06F 12/0246* (2013.01); *G06F 12/0802* (2013.01); *G06F 2212/60* (2013.01)

(58) Field of Classification Search
CPC ...... G06F 3/0619; G06F 3/065; G06F 3/0685; G06F 3/0608; G06F 12/0802; G06F 12/0238; G06F 12/0246; G06F 2212/60; G06F 11/1446; G06F 11/1448
See application file for complete search history.

(56) References Cited

U.S. PATENT DOCUMENTS

| | | | | |
|---|---|---|---|---|
| 2010/0329092 | A1* | 12/2010 | Ueno ................... | G06F 3/0608 369/47.34 |
| 2012/0159058 | A1* | 6/2012 | Yonezawa ........... | G11C 11/5628 711/104 |
| 2012/0215993 | A1* | 8/2012 | Yamashita .......... | G06F 12/0653 711/154 |

* cited by examiner

*Primary Examiner* — Shawn X Gu
(74) *Attorney, Agent, or Firm* — Lowenstein Sandler LLP

(57) ABSTRACT

The present invention is directed to memory systems. More specifically, embodiments of the present invention provide a memory system with a volatile memory, a persistent memory, and a controller. In a save operation, the controller copies contents of the volatile memory to the persistent memory as data units with their corresponding descriptor fields, where the descriptor fields include address information. In a restore operation, the controller copies data units from the persistent memory to their corresponding locations based on addresses stored at descriptor fields. There are other embodiments as well.

20 Claims, 5 Drawing Sheets

400

| Field | Configurable Bytes (below is an example) | CSR or HW |
|---|---|---|
| DDCR Format Revision | 1 | CSR |
| DDCR Format Revision –Complement | 1 | HW Generated during SAVE |
| DDCR Tag | 2 | CSR |
| DDCR Tag –Complement | 2 | HW Generated during SAVE |
| DMA Physical Address (MSB) | 4 | HW Generated during SAVE operation |
| DMA Physical Address –Complement | 4 | HW Generated during SAVE operation |
| DMA Length | 2 | HW Generated during SAVE operation |
| DMA Length –Complement | 2 | HW Generated during SAVE operation |
| CRC (Calculation on DMA Physical Address & Length) | 1 | HW Generated during SAVE operation |
| Logical Persistent Memory Address | 3 | HW Generated during SAVE operation. Starts at zero |
| Logical Persistent Memory Address – Complement | 3 | HW Generated during SAVE operation. Starts at zero |
| Reserved | 15 | HW Generated during SAVE operation |
|  |  |  |

PERSISTENT MEMORY DESCRIPTOR

RELATED APPLICATIONS

This application is a continuation of U.S. patent application Ser. No. 14/963,098, filed Dec. 8, 2015, now U.S. Pat. No. 9,785,365, issued on Oct. 10, 2017, the entire contents of which are hereby incorporated by reference herein.

BACKGROUND OF THE INVENTION

The present invention is directed to memory systems.

As the massive volumes of electronically stored and transmitted data (e.g., "big data") continue to increase, so does the need for electronic data storage that is reliable and cost yet quickly accessible (e.g., low latency). Specifically, more computing applications are requiring that increasingly larger data sets be stored in "hot" locations for high speed access. Certain non-volatile memory (NVM) storage technologies, such as magnetic hard disk drives (HDDs), can provide a reliable, low cost storage solution, yet with relatively high access latencies. Such storage technologies might be used for large volumes of data in "cold" locations that are not often accessed (e.g., data warehouses, archives, etc.). Other volatile or "dynamic" memory storage technologies, such as dynamic random access memory (DRAM), provide lower access latencies, and might be used in "hot" locations near a computing host (e.g., CPU) to offer fast access to certain data for processing. Yet, such storage technologies can have a relatively high cost and risk of data loss (e.g., on power loss). Solid state NVM, such as Flash memory, can offer an improved form factor and access latency as compared to a hard disk, yet still not approach the access latency of DRAM.

In some cases, DRAM and Flash can be combined in a hybrid memory module to deliver the fast data access of the DRAM and the non-volatile data integrity (e.g., data retention) enabled by the Flash memory. One such implementation is the non-volatile dual in-line memory module (NVDIMM), which stores data in DRAM for normal operation, and stores data in Flash for backup and/or restore operations (e.g., responsive to a power loss, system crash, normal system shutdown, etc.).

Among other things, moving information stored at the NVM to volatile memory can be inadequate with conventional implementations, and improved techniques are desired.

BRIEF SUMMARY OF THE INVENTION

The present invention is directed to memory systems. More specifically, embodiments of the present invention provide a memory system with a volatile memory, a persistent memory, and a controller. In a save operation, the controller copies contents of the volatile memory to the persistent memory as data units with their corresponding descriptor fields, where the descriptor fields include address information. In a restore operation, the controller copies data units from the persistent memory to their corresponding locations based on addresses stored at descriptor fields. There are other embodiments as well.

According to an embodiment, the present invention provides a memory system that has a first DRAM device and a persistent memory module. The system also includes a memory controller that is configured to copy source data from the first DRAM device to a predetermined location of the persistent memory module in a save operation. The memory controller is further configured to copy backup data from the predetermined location to the first DRAM in a restore operation. In the save operation, the memory controller generates descriptor fields corresponding to segments of the source data. The descriptor fields includes DRAM addresses. The persistent memory module stores the segments of the source data with the descriptor fields as data units of the backup data. In the restore operation, the memory controller reads the data units from the persistent memory module and determines the DRAM addresses of the data units using the descriptor fields.

According to another embodiment, the present invention provides a memory system that includes a plurality of DRAM devices, which has a first DRAM device. The system also includes a bus and a command buffer. The system further includes a persistent memory module. The system includes a memory controller that is configured to copy source data via the bus from the first DRAM device to a predetermined location of the persistent memory module in a save operation. The memory controller is also configured to copy backup data from the predetermined location to the first DRAM in a restore operation. In the save operation, the memory controller generates descriptor fields corresponding to segments of the source data. The descriptor fields include DRAM addresses. The persistent memory module stores the segments of the source data with the descriptor fields as data units of the backup data. In the restore operation, the memory controller reads the data units from the persistent memory module and determines the DRAM addresses of the data units using the descriptor fields.

According to yet another embodiment, the present invention provides a memory system that includes a plurality of DRAM devices including a first DRAM device and a bus. The system also includes a persistent memory module. The system further includes a memory controller that is configured to copy source data via the bus from the first DRAM device to a predetermined location of the persistent memory module in a save operation. The memory controller is also configured to copy backup data from the predetermined location to the first DRAM in a restore operation. The system further includes a command buffer coupled to the memory controller, the plurality of DRAM devices, and the persistent memory module. In the save operation, the memory controller generates descriptor fields corresponding to segments of the source data. The descriptor fields include DRAM addresses. The persistent memory module stores the segments of the source data with the descriptor fields as data units of the backup data. In the restore operation, the memory controller reads the data units from the persistent memory module and determines the DRAM addresses of the data units using the descriptor fields.

Embodiments of the present invention provide many advantages over conventional techniques. Among other things, by using descriptor fields to identify DRAM target location, the needs of software intervention of large DMA streams between DRAM memory and persistent memory is substantially reduced or eliminated. In addition, the use of descriptor fields enables fast save/restore execution through larger DMA transfers. It helps to eliminate returned data queues for ordering purposes, which results in smaller gaps between data units. In addition, out of order return of data streams from persistent memory require no intervention from a controlling processor as the embedded descriptor fields provide the control information to return data to its proper location in DRAM memory. In addition, embodiments of the present invention can be easily implemented and adopted into existing systems. For example, DMA controllers can be programmed to create and use descriptor fields for save and restore operations. There are many other advantages as well.

The present invention achieves these benefits and others in the context of known technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

FIG. 4 is a simplified diagram illustrating a persistent memory section according to an embodiment of the present invention.

DETAILED DESCRIPTION OF THE INVENTION

Figure 1:
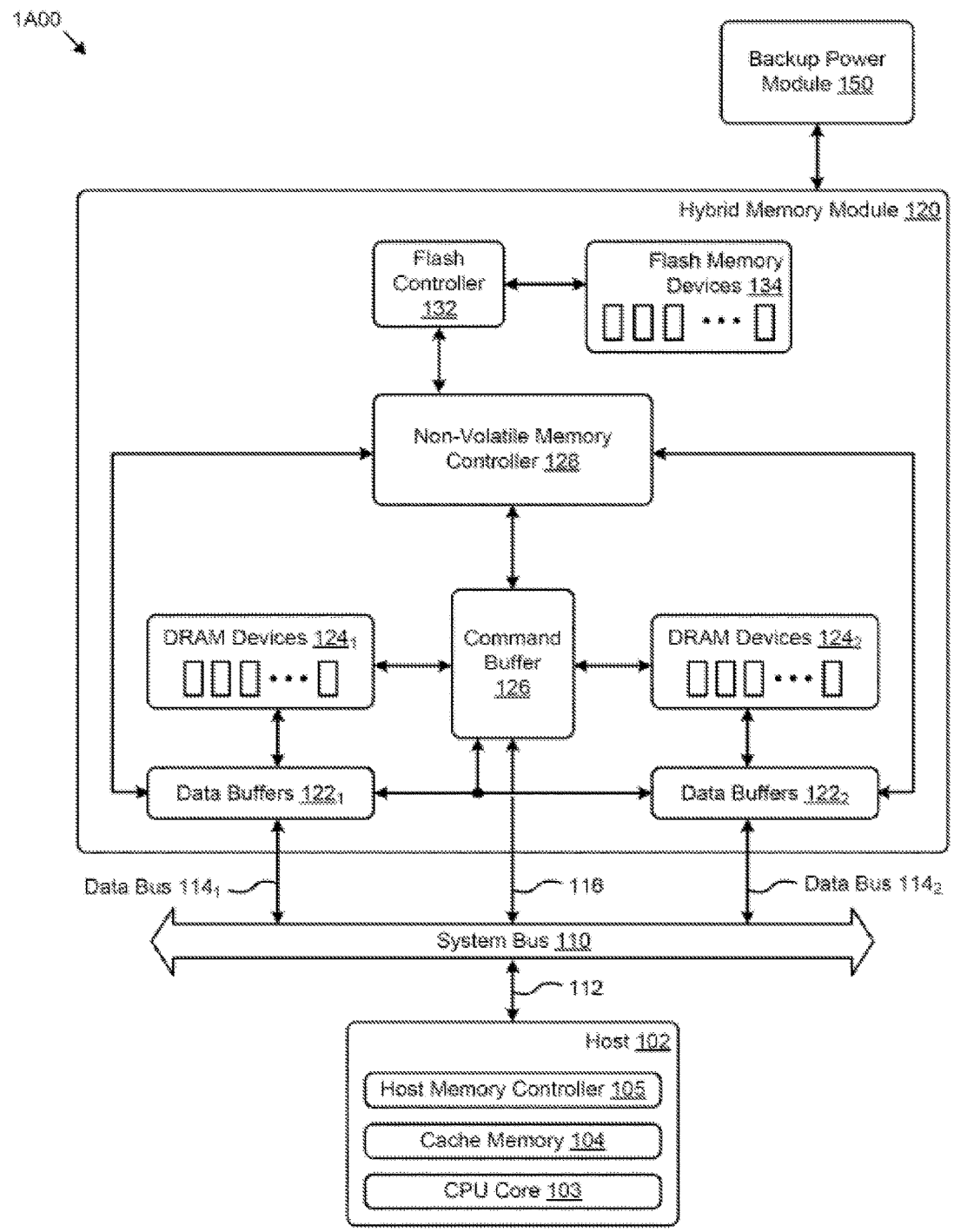
FIG. 1 is a simplified diagram illustrating memory management system according to an embodiment of the present invention.

The present invention is directed to memory systems. More specifically, embodiments of the present invention provide a memory system with a volatile memory, a persistent memory, and a controller. In a save operation, the controller copies contents of the volatile memory to the persistent memory as data units with their corresponding descriptor fields, where the descriptor fields include address information. In a restore operation, the controller copies data units from the persistent memory to their corresponding locations based on addresses stored at descriptor fields. There are other embodiments as well.

As mentioned above, conventional techniques for NVDIMM systems have been inadequate. A typical function of a NVDIMM system is to have the persistent memory (e.g., NVM) backup the data stored at the persistent memory (e.g., in the events of power failure, hibernation mode, etc.), and the data stored at the persistent memory is copied back to the volatile memory (or sometimes a different volatile memory module). For example, volatile memory is often implemented using DRAM, and persistent memory are typically implemented using solid-state memory (e.g., NAND flash memory). For example, in a save/backup operation, all of the all DRAM contents are saved to persistent memory. Later, the contents that were previous backed up at the persistent memory are pushed back to the DRAM. More specifically, DRAM physical addresses are mapped to logical addresses in the persistent memory. The logical addresses are translated to persistent memory physical addresses. Unfortunately, persistent memory does not guarantee the order of input commands, which means that sequential requests are not guaranteed to have sequential responses. As a result, the NVDIMM system often needs to slow down or make correction for the non-sequential reading of the persistent memory. For the host controller to take care of the non-sequential data blocks, it typically relies on software solutions that align the data block, which is extra work on the host side and slows down the restore process. It is to be appreciated that embodiments of the present invention overcome this issue by using memory descriptors and processes thereof to provide data alignment.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

As explained above, an important aspect of NVDIMM system operation is to read the contents that are stored at the persistent memory and push the content to volatile memory. For example, in a DIMM save operation, a direct memory access (DMA) engine performs an operation to pull data from DRAM (i.e., a read operation) and push onto a persistent memory in a predetermined fashion. In a DIMM restore operation, the DMA engine performs a pull (i.e., write) to obtain the saved data from the persistent memory and push into DRAM. According to various embodiments, an embedded DMA engine is configured to insert programmed dynamic descriptor (DDCR) information into a data stream to be stored with data in persistent memory. As an example, "DMA engine" and "DMA controller" refer to system control modules that provide memory access functionalities, which may include host controller and flash controller in a NVDIMM system. It is to be appreciated that the embedded DDCR eliminates the need for sideband control signals (typically provided by a control module) to signify start and end boundaries in applications where fixed or known transfer sizes occur. In various embodiments, protection of embedded DDCRs utilizes a combination of cycle redundancy check (CRC) and true/compliment fields to authenticate that the DDCR can be used.

In various embodiment, the present invention embodies a method to dynamically embed DDCR data within a DMA data stream, which allows it to provide a method of tracking data source information that is be used to return data to correct source location at a later time. Typically in DMA activity within a computer system, associated sideband control signals accompany data flits to distinguish the start and end of a data unit (e.g., packet). If fixed or known sizes of data units transferred are known, a DMA engine may transfer data units from source to destination with minimal or no overhead. During a push from a source DRAM memory location to a persistent memory, the DMA engine periodically (based on programming) injects a DDCR field within the data stream. For example, this field is predefined to occupy a fixed number of bits. Fields within the descriptor have current information regarding source address, logical destination address, and other programmable register sourced information to be used by the DMA engine to return the data back to the source in the correct location in the event that a pull operation occurs. DMA engine is configured to perform validity check by examining the CRC and true/compliment fields. By embedding DDCR data into a data unit in a predetermined format, out of order responses from persistent memory can be handled by the DMA engine without the need of a processor to manage persistent memory logical addresses translation to DRAM physical addressing.

FIG. 1 is a simplified diagram illustrating memory management system according to an embodiment of the present invention. This diagram is merely an example, which should not unduly limit the scope of the claims. One of ordinary skill in the art would recognize many variations, alternatives, and modifications. As an example, memory systems and operations thereof are described in U.S. patent application Ser. No. 14/883,155, filed 14 Oct. 2015, entitled "HIGH-THROUGHPUT LOW-LATENCY HYBRID MEMORY MODULE", which is incorporated by reference herein for all purposes. As shown in FIG. 1, environment 1A00 comprises a host 102 coupled to a hybrid memory module 120 through a system bus 110. The host 102 further comprises a CPU core 103, a cache memory 104, and a host memory controller 105. Host 102 can comprise multiple instances each of CPU core 103, cache memory 104, and host memory controller 105. The host 102 of environment 1A00 can further be based on various architectures (e.g., Intel x86, ARM, MIPS, IBM Power, etc.). Cache memory 104 can be dedicated to the CPU core 103 or shared with other cores. The host memory controller 105 of the host 102 communicates with the hybrid memory module 120 through the system bus 110 using a physical interface 112 (e.g., compliant with the JEDEC DDR4 SDRAM standard, etc.). Specifically, the host memory controller 105 can write data to and/or read data from a first set of DRAM devices $124_1$ and a second set of DRAM devices $124_2$ using a data bus $114_1$ and a data bus $114_2$, respectively. For example, the data bus $114_1$ and the data bus $114_2$ can transmit the data as electronic signals such as a data signal, a chip select signal, or a data strobe signal. The DRAM devices $124_1$ and/or the DRAM devices $124_2$ might each comprise an array of eight or nine $DDR_4$ memory devices (e.g., SDRAM) arranged in various topologies (e.g., AlB sides, single-rank, dual-rank, quad-rank, etc.). Other memory devices (e.g., DDR3 memory devices) can comprise the DRAM devices. In some cases, as shown, the data to and/or from the DRAM devices $124_1$ and the DRAM devices $124_2$ can be buffered by a set of data buffers $122_1$ and data buffers $122_2$, respectively. Such data buffers can serve to boost the drive of the signals (e.g., data or DQ signals, etc.) on the system bus 110 to help mitigate high electrical loads of large computing and/or memory systems.

Further, commands from the host memory controller 105 can be received by a command buffer 126 (e.g., registering clock driver or RCD) at the hybrid memory module 120 using a command and address (CA) bus 116. For example, the command buffer 126 might be a registering clock driver (RCD) such as included in registered DIMMs (e.g., RDIMMs, LRDIMMs, etc.). Command buffers such as command buffer 126 can comprise a logical register and a phase-lock loop (PLL) to receive and re-drive command and address input signals from the host memory controller 105 to the DRAM devices on a DIMM (e.g., DRAM devices $124_1$, DRAM devices $124_2$, etc.), reducing clock, control, command, and address signal loading by isolating the DRAM devices from the host memory controller 105 and the system bus 110. In some cases, certain features of the command buffer 126 can be programmed with configuration and/or control settings. As an example, the host controller 105, along with command buffer 126, provides DMA functions.

The host memory controller 105 is configured to generate and use DDCR information. For example, during a backup operation, the host memory controller obtains content data from the volatile memory (e.g., DRAM) and pushes the content data to the persistent memory (e.g., flash memory). For example, content data from the volatile memory is contiguous data stream. Depending on the implementation, the host memory controller 105 injects DDCR information into the data stream periodically or intermittently, and the DDCR information is stored at the persistent memory along the corresponding data units. More specifically, the DDCR information is stored according to a predefined DDCR field. For example, the DDCR field occupies a predetermined number of bits, which include current information regarding source address, logical destination address, and/or other programmable register sourced information. Injecting DDCR fields into the data stream effectively breaks the data streams into data units. For example, if the DDCR is injected into the data stream periodically, data units may be characterized by the same data size. On the other hand, if the DDCR is injected into the data stream at irregular intervals, data units may have difference sizes, and the size and memory location of the data unit are stored at the DDCR field.

The host memory controller 105 is also capable of uses the DDCR information during restore operations. For example, during a restore operation, the host memory controller 105 obtains data from the persistent memory. As explained above, since access or reading of the persistent memory does not guarantee the order of input comments, data units received by the persistent memory can be out of sequence. For example, for a string of sequential data request, the responses from the persistent memory can be non-sequential. Instead of using sideband control signals, a technique commonly employed in conventional systems, the host memory controller 105 determines locations of the data units by processing the their respective DDCR fields. As described above, DDCR fields include volatile memory location (e.g., DMA physical address) for the respective memory units. By determining the target write location at the volatile memory (e.g., DRAM physical location), the host memory controller or the DMA engine is able to write data units to the volatile memory as they become available (e.g., pulled from the persistent memory) without having to wait until the data units are sequentially aligned. For example, for a two non-sequential data units pulled from the persistent memory, the DMA engine determines physical address from their CCDR fields and store these data units to their respective physical addresses in the DRAM.

The hybrid memory module 120 shown in FIG. 1A further comprises a non-volatile memory controller 128 coupled to a flash controller 132 and a set of flash memory devices 134. The presence of the flash memory devices 134 (e.g., NAND flash memory chips) and the DRAM devices on a dual in-line memory module (DIMM), in part, defines the "hybrid" characteristic of the hybrid memory module 120, at least according to JEDEC. Such hybrid memory modules can be referred to as non-volatile DIMMs (NVDIMMs), and can appear as a DRAM DIMM to the system controller (e.g., host memory controller 1 05) and/or share a memory channel with other DRAM DIMMs. For example, JEDEC has identified three NVDIMM configurations as follows:

NVDIMM-N: A hybrid memory module consisting of DRAM made persistent through the use of Flash memory. No Flash memory beyond that needed for persistence operations (e.g., data backup, data restore, etc.) is accessible by the host memory controller.

NVDIMM-P: A hybrid memory module consisting of DRAM made persistent through the use of Flash memory. Flash memory beyond that needed for persistence is accessible by the host memory controller as a block-oriented mass storage device.

NVDIMM-F: A hybrid memory module consisting of Flash memory accessed by the host memory controller as a block-oriented mass storage device.

The hybrid memory module 120 shown in environment 1A00 can be considered an NVDIMM-N configuration. As such, a backup power module 150 is shown coupled to the hybrid memory module 120 to deliver power to the hybrid memory module 120 during persistence operations such as data backup and data restore in the event of a system power loss. For example, the backup power module 150 might comprise super capacitors (e.g., supercaps) and/or battery packs attached to the hybrid memory module 120 via a tether cable and store enough charge to keep at least a portion of the hybrid memory module 120 powered up long enough to copy all of its data from the DRAM to the flash memory. Further, the hybrid memory module 120 shown in environment 1A00 presents merely one partitioning. The specific example shown where the command buffer 126, the non-volatile memory controller 128, and the flash controller 132 are separate components is purely exemplary, and other partitioning is reasonable. For example, any or all of the components comprising the hybrid memory module 120 and/or other components can comprise one device (e.g., system-on-chip or SoC), multiple devices in a single package or printed circuit board, multiple separate devices, and can have other variations, modifications, and alternatives. Unfortunately, legacy NVDIMM architectures can have functional and performance limitations. Specifically, some NVDIMMs can exhibit long latencies and low throughput during certain operations, such as those pertaining to data backup and/or data restore operations. The herein disclosed techniques address such limitations and other legacy issues as described in the following and throughout.

Figure 2A:
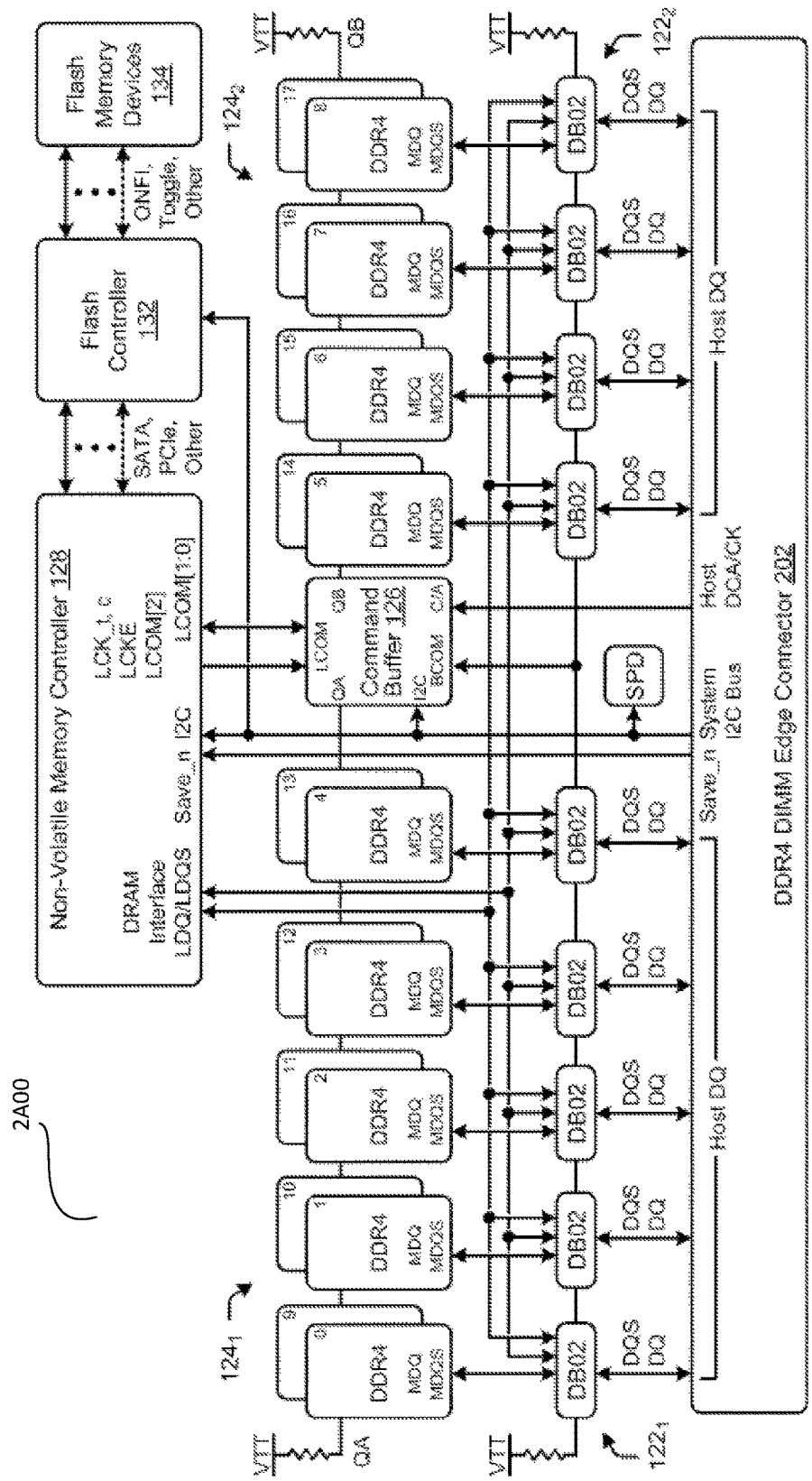
FIG. 2A is a schematic of a hybrid memory module 2A00.

FIG. 2A is a schematic of a hybrid memory module 2A00. This diagram is merely an example, which should not unduly limit the scope of the claims. One of ordinary skill in the art would recognize many variations, alternatives, and modifications. As an option, one or more instances of hybrid memory module 2A00 or any aspect thereof may be implemented in the context of the architecture and functionality of the embodiments described herein. Also, the hybrid memory module 2A00 or any aspect thereof may be implemented in any desired environment. The hybrid memory module 2A00 is an example of an NVDIMM configuration. Specifically, the DRAM devices of the hybrid memory module 2A00 comprise 18 DDR4 devices (e.g., ten instances of DRAM devices $124_1$ and eight instances of DRAM devices $124_2$) having data signals (e.g., DQ, DQS, etc.) delivered to a DDR4 DIMM edge connector 202 through a plurality of data buffers (e.g., five instances of data buffers $122_1$ and four instances of data buffers $122_2$). In some cases, two DDR4 devices can share the high bit rate MDQ/MDQS signal connections to a respective data buffer (e.g., DB02 device) in a parallel configuration. Further, a first portion of the DDR4 devices (e.g., DDR4-0 to DDR4-4, and DDR4-9 to DDR4-13) can comprise an A-side of the DRAM configuration, and a second portion of the DDR4 devices (e.g., DDR4-5 to DDR4-8 and DDR4-14 to DDR4-17) can comprise a B-side of the DRAM configuration. In some cases, such configurations can be detected by a serial presence detector or SPD at module initialization. The non-volatile memory controller 128 can further have access to the DDR4 device data signals through an LDQ/LDQS path between the data buffers and the "DRAM Interface" of the non-volatile memory controller 128.

As shown, the command buffer 126 can receive commands, addresses, and other information through the DDR4 DIMM edge connector 202 at an input command/address or C/A interface. The command buffer 126 can further communicate (e.g., receive local commands) with the non-volatile memory controller 128 using a local communications interface supporting a physical layer communications protocol such as the LCOM interface protocol defined by JEDEC. The command buffer 126 can communicate (e.g., forward DRAM commands) with the DDR4 devices using an output control/address/command interface (e.g., see the QA output signals for communicating with the A-side, and the QB output signals for communicating with the B-side). In some cases, the command buffer 126 can also communicate (e.g., send control setting commands) with the data buffers using a data buffer control/communication or BCOM interface. Other signals shown in FIG. 2A include those pertaining to the I2C serial bus and the Save_n memory system signal (e.g., for invoking a backup operation at power loss).

Figure 2B:
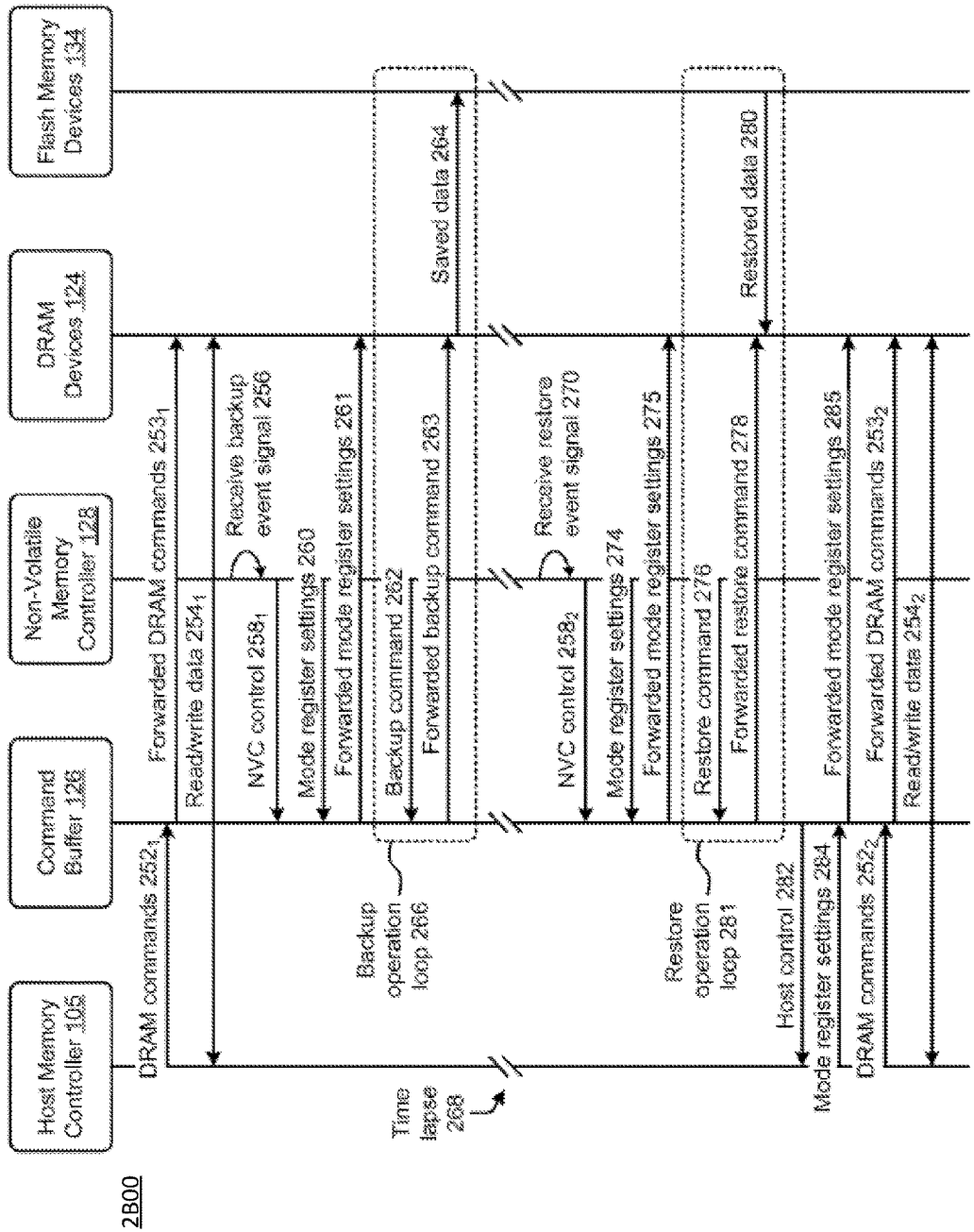
FIG. 2B shows interactions among hybrid memory module components 2B00 pertaining to backup and restore events.

The foregoing signals, interfaces, connections, and other components of the hybrid memory module 2A00 can be used to execute backup and restore operations as discussed in FIG. 2B. This diagram is merely an example, which should not unduly limit the scope of the claims. One of ordinary skill in the art would recognize many variations, alternatives, and modifications. FIG. 2B shows interactions among hybrid memory module components 2B00 pertaining to backup and restore events. As an option, one or more instances of interactions among hybrid memory module components 2B00 or any aspect thereof may be implemented in the context of the architecture and functionality of the embodiments described herein. Also, the interactions among hybrid memory module components 2B00 or any aspect thereof may be implemented in any desired environment.

As shown in FIG. 2B, the interactions among hybrid memory module components 2B00 specifically pertain to interactions among the earlier described components comprising the host memory controller 105, the command buffer 126, the non-volatile memory controller 128, the collective set of DRAM devices 124, and the flash memory devices 134. Such components can exhibit a set of high-level interactions (e.g., operations, messages, etc.) as shown. Specifically, the interactions can pertain to backup and restore operations executed on a hybrid memory module. As shown, the host memory controller 105 might have control (e.g., in a host control mode) so as to issue DRAM commands to the command buffer 126 (see message $252_1$) that might be forwarded to the DRAM devices 124 (see message $253_1$). In some cases, the DRAM commands can result in read and/or write data transferred between the host memory controller 105 and the DRAM devices 124 (see message $254_1$).

Such activity might continue until a data backup event signal is received at the nonvolatile memory controller 128 (see operation 256). For example, the host and/or the hybrid memory module might have detected the loss of power and triggered the data backup event. Such backup events can be invoked at the non-volatile memory controller 128 from the host memory controller 105 (e.g., via the command buffer 126), from the Save_n signal, and from the I2C bus. In response, control can be provisioned to the non-volatile memory controller 128 by, for example, writing to certain control register settings of the command buffer 126 (see message $258_1$). The backup operation might then commence with the non-volatile memory controller 128 sending new mode register settings (e.g., specific to the backup operation) to the command buffer 126 (see message 260) that can be forwarded to the DRAM devices 124 (see message 261). The non-volatile memory controller 128 can then begin to issue backup commands to the command buffer 126 (see message 262) that can be forwarded to the DRAM devices 124 (see message 263) to save data from the DRAM devices 124 to the flash memory devices 134 (see message 264). Such backup interactions can continue in a loop (see loop 266) until the backup operation is complete (e.g., all data is saved).

During the backup operation, DRAM data stream is breaking into sections before copying into the persistent memory. For each of the memory sections, the DMA creates a DDCR field comprising DRAM physical address information corresponding to the data stored at the memory section.

After a time lapse 268, a data restore event signal might be received by the nonvolatile memory controller 128 (see operation 270). For example, the line power to the computing system might have returned to trigger the data restore event. In response, control can be provisioned to the non-volatile memory controller 128 by, for example, writing to certain control register settings of the command buffer 126 (see message $258_2$). The restore operation might commence with the non-volatile memory controller 128 sending new mode register settings (e.g., specific to the restore operation) to the command buffer 126 (see message 274) that can be forwarded to the DRAM devices 124 (see message 275). The non-volatile memory controller 128 can then begin to issue restore commands to the command buffer 126 (see message 276) that can be forwarded to the DRAM devices 124 (see message 278) to restore data from the flash memory devices 134 to the DRAM devices 124 (see message 280). Such restore interactions can continue in a loop (see loop until the restore operation is complete (e.g., all data is restored).

During the restore operation, data contents, as read by the controller, may be accessed non-sequentially. For example, DMA engine determines DRAM physical locations using the DDCR fields, and non-sequential data blocks from the persistent memory are pushed to DRAM locations based on the information stored at the DDCR fields.

When the restore is completed, the command buffer 126 can provision control to the host memory controller 105 (see message 282). The host memory controller 105 might then initialize the host control session by sending new mode register settings (e.g., specific to host operations) to the command buffer 126 (see message 284) that can be forwarded to the DRAM devices 124 (see message 285). The host memory controller 105 can then resume memory access operations by issuing DRAM commands to the command buffer 126 (see message $252_2$) to be forwarded to the DRAM devices 124 (see message $253_2$) to invoke, in some cases, the transfer of read and/or write data between the host memory controller 105 and the DRAM devices 124 (see message $254_2$).

Figure 3:
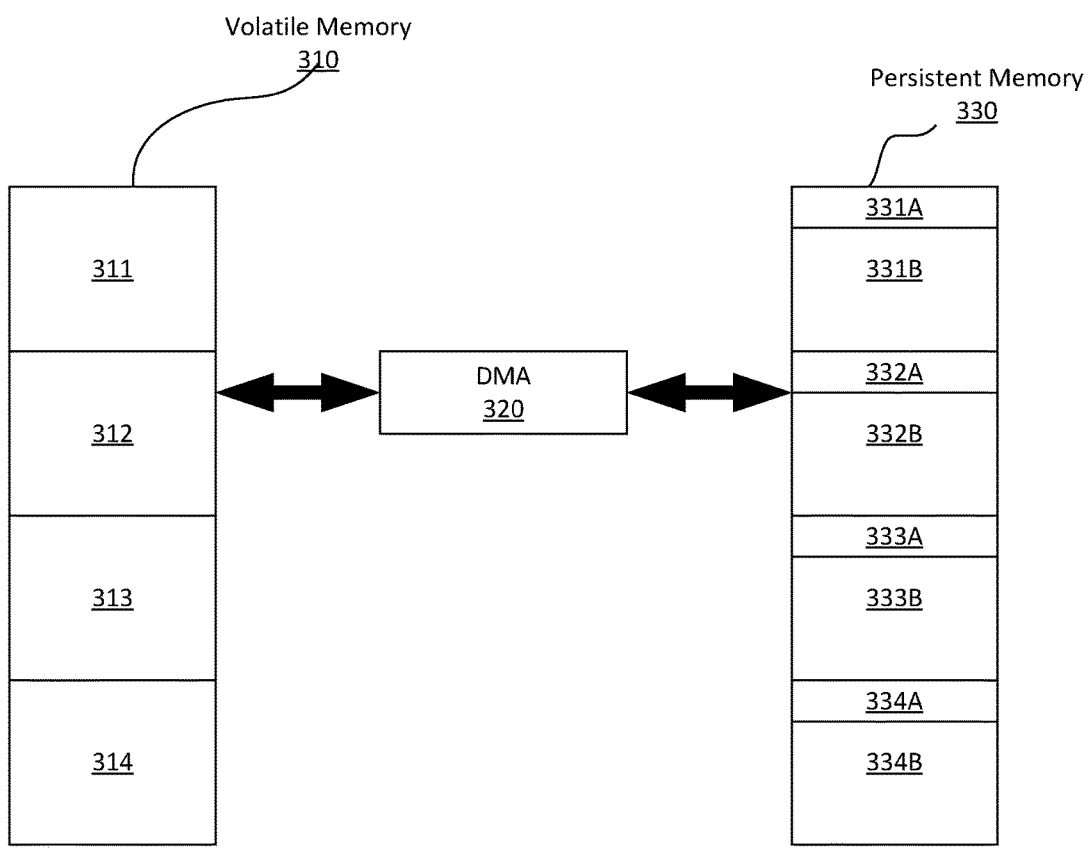
FIG. 3 is a simplified diagram illustrating operation of a memory management system according to an embodiment of the present invention.

FIG. 3 is a simplified diagram illustrating operation of a memory management system according to an embodiment of the present invention. This diagram is merely an example, which should not unduly limit the scope of the claims. One of ordinary skill in the art would recognize many variations, alternatives, and modifications. The memory management system 300 includes a volatile memory 310, a DMA 320, and a persistent memory 330. The volatile memory 310 may be implemented using DRAM. The persistent memory 330, as an example, can be implemented using NAND flash memory or other types of memory devices that are capable of retaining data without power. As an example, volatile memory 310 as shown comprises memory sections 311, 312, 313, and 314 that are contiguous. It is to be understood that volatile memory 310 is logically divided into these four memory sections for illustration purpose, and actual memory systems may have a number of logical sections. The persistent memory 330 comprises memory sections 331B, 332B, 333B, and 334B. Typically, the capacity of persistent memory 330 is larger than the capacity of the volatile memory, leaving headroom for storing additional data as needed. For example, a persistent memory can be used to backup multiple DRAM devices. Depending on the implementation, memory sections may be of the same size or different sizes. During a backup operation, content of volatile memory 310 is copied to the persistent memory 330. More specifically, the DMA module 320 reads data from volatile memory 310 as a continuous data stream, where DMA module 320 sequentially reads memory sections 311, 312, 313, and 314. The contents at these memory sections are stored at the persistent memory 330. As these contents are written to the persistent memory, the DMA module 320 creates and updates DDCR fields. For example, as DMA 320 copies the contents stored at memory section 311, DMA module 320 creates a DDCR field 331A, and the contents of the memory section 311 is stored at memory section 331B. Among other things, the DDCR field 331A includes information related to the physical location and size of the memory section 311, which are later used in the restore operation. Similarly, as DMA module 320 copies the contents stored at memory section 312, DMA module 320 creates a DDCR field 332A, and the contents of the memory section 312 is stored at memory section 332B. Typically, data are copied sequentially during the backup operation, which means contents of memory section 311 is copied to memory section 331B first, followed up copying memory section 312 content to memory section 332B, and so on. It is to be appreciated that depending on the implementation, DMA module 320 may copy data from volatile memory 310 to the persistent memory 330 non-sequentially as well.

During a restore operation, DMA module 320 copies contents from persistent memory 330 to the volatile memory 310. Ideally, the read requests from the DMA module is sequential (i.e., reading memory section 331B first, then 332B, 333B next, and finally 334B). However, as explained above, persistent memory 330 often cannot provide sequential responses. For while DMA module 320 have a sequence of requests for accessing 331B, 332B, 333B, and the persistent memory 330 may read memory section 332B first, then 334B second. It is to be appreciated that since DDCR fields comprise physical location information, the DMA 320 can easily determine how to copy out of sequence data units from the persistent memory 330 to volatile memory 310. For example, during a read sequence, DMA module 320 may first read content from memory section 332B before reading content from memory section 331B. By processing DDCR field 332A that is associated with memory section 332B, DMA module 320 determines that the corresponding location at volatile memory 310 is at memory section 312, and proceeds to copy contents stored at memory section 332B to memory section 312. Later, when DMA module 320 reads contents from memory section 331B, it copies this content to memory section 311. Even though the sequence of reading information from the persistent memory 330 is out of order, the restore operation correctly copies contents from the persistent memory 330 to correct locations of volatile memory 310.

FIG. 4 is a simplified diagram illustrating a persistent memory section according to an embodiment of the present invention. This diagram is merely an example, which should not unduly limit the scope of the claims. One of ordinary skill in the art would recognize many variations, alternatives, and modifications. As shown in FIG. 4, memory block 400 includes a DDCR section 401 and a memory section 402 (not drawn in proportion to their capacities or sizes). For example, DDCR section 401 corresponds to DDCR field 331A and memory section 402 corresponds to memory section 331B in FIG. 3. Among other things, the DDCR section 401 comprises predefined fields that includes, among other things, memory address information that used when copying data at memory section 402 to a volatile memory. In addition, depending on the implementation and DMA functionalities, the DDCR section 401 may additionally include data format information, CRC information, and/or others.

It is to be appreciated that embodiments of the present invention provide many advantages. Among other things, by using DDCR fields to identify DRAM target location, the needs of software intervention of large DMA streams between DRAM memory and persistent memory is substantially reduced or eliminated. In addition, the use of DDCR fields enables fast save/restore execution through larger DMA transfers. It helps to eliminate returned data queues for ordering purposes, which results in smaller gaps between data units. In addition, out of order return of data streams from persistent memory require no intervention from a controlling processor as the embedded DDCR provides the control information to return data to its proper location in DRAM memory. There are many other advantages as well.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A memory controller comprising:
a processing unit configured to generate descriptor fields for memory operations occurring between a volatile memory and a persistent memory coupled to the memory controller, wherein each descriptor field corresponds to a segment of source data in the volatile memory and stores an address of the corresponding segment, the processing unit to store each segment of the source data with the corresponding descriptor field as backup data in the persistent memory and to read the backup data from the persistent memory and determine the corresponding address of each segment in the volatile memory from the corresponding descriptor field.

2. The memory controller of claim 1, wherein each descriptor field further comprises version control information.

3. The memory controller of claim 1, wherein each descriptor field further comprises error correction information.

4. The memory controller of claim 1, wherein the volatile memory comprises one or more dynamic random access memory (DRAM) modules.

5. The memory controller of claim 1, wherein the persistent memory comprises one or more flash memory modules.

6. The memory controller of claim 1, wherein to read the backup data from the persistent memory, the processing unit to read one or more segments non-sequentially.

7. The memory controller of claim 6, wherein the processing unit is configured to restore the one or more segments from the persistent memory to the corresponding addresses in the volatile memory based on information stored in the corresponding descriptor fields in the backup data.

8. The memory controller of claim 7, wherein the processing unit is configured to write the one or more segments to the corresponding addresses in the volatile memory without waiting until the one or more segments are sequentially aligned.

9. A method comprising:
initiating, by a memory controller, a save operation to copy one or more segments of source data in a volatile memory to a persistent memory;
generating a descriptor field corresponding to each segment of the source data, wherein each descriptor field stores an address of the corresponding segment in the volatile memory;
storing the one or more segments of the source data with the corresponding descriptor fields as backup data in the persistent memory; and
reading the backup data from the persistent memory to determine the addresses of the one or more segments in the volatile memory from the corresponding descriptor fields.

10. The method of claim 9, wherein each descriptor field further comprises version control information.

11. The method of claim 9, wherein each descriptor field further comprises error correction information.

12. The method of claim 9, wherein the volatile memory comprises one or more dynamic random access memory (DRAM) modules.

13. The method of claim 9, wherein the persistent memory comprises one or more flash memory modules.

14. The method of claim 9, wherein reading the backup data from the persistent memory comprises reading the one or more segments non-sequentially.

15. The method of claim 14, further comprising:
initiating a restore operation to copy the one or more segments from the persistent memory to the corresponding addresses in the volatile memory based on information stored in the corresponding descriptor fields in the backup data.

16. The method of claim 15, further comprising:
writing the one or more segments to the corresponding addresses in the volatile memory without waiting until the one or more segments are sequentially aligned.

17. A memory controller comprising:
a processing unit configured to generate descriptor fields for memory operations occurring between a dynamic random access memory (DRAM) module and a flash memory module coupled to the memory controller, wherein each descriptor field corresponds to a segment of source data in the DRAM module and stores an address of the corresponding segment, the processing unit to store each segment of the source data with the descriptor field as backup data in the flash memory module and to read the backup data from the flash memory module and determine the corresponding address of each segment in the DRAM module from the descriptor field.

18. The memory controller of claim 17, wherein each descriptor field further comprises version control information.

19. The memory controller of claim 17, wherein each descriptor field further comprises error correction information.

20. The memory controller of claim 17, wherein the processing unit is configured to restore one or more non-sequential segments from the flash memory module to the corresponding addresses in the volatile memory based on information stored in the corresponding descriptor fields in the backup data without waiting until the one or more segments are sequentially aligned.

* * * * *